United States Patent
Dunlap et al.

(10) Patent No.: US 6,644,647 B2
(45) Date of Patent: *Nov. 11, 2003

(54) APPARATUS AND METHOD FOR TRANSFERRING LABELS FROM A LABEL MAGAZINE FOR IN-MOLD LABELING PRIOR TO BLOW MOLDING

(75) Inventors: Richard L. Dunlap, Cairo, OH (US); Edward L. Sanford, Lima, OH (US); David M. Amirault, Troy, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/902,423

(22) Filed: Jul. 9, 2001

(65) Prior Publication Data

US 2003/0006545 A1 Jan. 9, 2003

(51) Int. Cl.⁷ .................................................. B65H 5/08
(52) U.S. Cl. .......................... 271/11; 271/94; 271/95; 271/106
(58) Field of Search ............................. 271/20, 21, 94, 271/95, 106, 11, 10.09; 264/509

(56) References Cited

U.S. PATENT DOCUMENTS

| | | | |
|---|---|---|---|
| 3,575,409 A | | 4/1971 | Calvert |
| 4,021,293 A | * | 5/1977 | Total ........................... 271/95 |
| 4,032,388 A | * | 6/1977 | Dunning ...................... 271/95 |
| 4,293,365 A | | 10/1981 | Geyser et al. |
| 4,350,466 A | * | 9/1982 | Bahr et al. .................... 271/95 |
| 4,359,216 A | * | 11/1982 | Leonard ....................... 271/95 |
| 4,479,770 A | | 10/1984 | Slat et al. |
| 4,639,207 A | | 1/1987 | Slat et al. |
| 4,680,000 A | | 7/1987 | Nowicki et al. |
| 4,834,641 A | | 5/1989 | Keyser |
| 4,909,723 A | | 3/1990 | Slat et al. |
| 4,973,241 A | | 11/1990 | Keyser |
| 5,044,922 A | | 9/1991 | Plenzler et al. |
| 5,050,855 A | * | 9/1991 | Focke et al. .................. 271/11 |
| 5,104,306 A | | 4/1992 | Gordon et al. |
| 5,266,149 A | | 11/1993 | Collette et al. |
| 5,472,184 A | * | 12/1995 | Focke et al. .................. 271/95 |
| 6,279,894 B1 | * | 8/2001 | Steinberg ..................... 271/95 |

* cited by examiner

Primary Examiner—David H. Bollinger
(74) Attorney, Agent, or Firm—Brooks Kushman P.C.

(57) ABSTRACT

Label transfer apparatus (160) and a method for transferring labels (54) from a label stack (164) for in-mold labeling prior to blow molding utilize a transfer head (168) that is movable on a rotary table (186) with additional transfer heads (168), adjacent a label magazine (162) with an exposed end (172) from which the labels are sequentially dispensed. The transfer head includes a pair of vacuum openings (174) to which a vacuum is supplied and an actuator (176) moves the transfer head with a rolling motion to engage the one vacuum opening with the label to initially pull an extremity (180) of the label, to subsequently pull an intermediate portion (182), and to finally engage the other vacuum opening with the label to pull an opposite extremity (184) of the label away from the label stack in a manner that permits high speed labeling.

14 Claims, 9 Drawing Sheets

APPARATUS AND METHOD FOR TRANSFERRING LABELS FROM A LABEL MAGAZINE FOR IN-MOLD LABELING PRIOR TO BLOW MOLDING

BACKGROUND OF THE INVENTION

1. Field of the Invention

This invention relates to a label transfer apparatus and method for use in transferring labels from a label magazine for in-mold labeling prior to blow molding.

2. Background Art

In-mold labeling has previously been performed with rotary wheel type blow molding machines as disclosed by U.S. Pat. Nos.: 4,479,770 Slat et al.; 4,639,207 Slat et al; 4,680,000 Nowicki et al.; 4,834,641 Keyser; 4,909,723 Slat et al.; 4,973,241 Keyser; 5,044,922 Plenzler et al.; 5,104,306 Gordon et al.; and 5,266,149 Collette et al.

Such in-mold labeling is performed by inserting a label within an open mold as the open mold is moved with other molds on a rotary wheel prior to the mold closing about an extruded plastic tube or about a hot plastic preform, whereupon blow molding of the extruded plastic tube or the preform bonds the label within the mold to the plastic and provides a smooth transition between the label and the adjacent blow molded surface. In addition to strengthening the blow molded container that results from this process, the more conventional post blow molding label application operation is eliminated.

In certain rotary blow molding machines, the production is very high, e.g., thousands of containers per hour and some as high as more than fifty thousand containers per hour with injection stretch blow molding machines that blow mold preforms as opposed to the extruded parison type of blow molding. Such high production rates make it difficult to place a label within the mold prior to the blow molding since there is little time to do so during the fraction of a second available to deposit the label within the mold.

Also, rapid in-mold labeling is made more difficult because label magazines in which the labels are stored normally are not capable of delivering the labels at a greater rate than about 60 to 70 labels per minute. Label stacks in which the labels are stored prior to being removed by vacuum pickup dispensing heads do not allow the labels to move away from the stack at a greater rate because air cannot normally move behind the labels fast enough to permit removal of more than 60 to 70 or so labels per minute.

Other prior art label systems noted during an investigation conducted in connection with the invention include U.S. Pat. Nos. 3,575,409 Calvert and 4,293,365 Geyser et al.

SUMMARY OF THE INVENTION

An object of the present invention is to provide improved apparatus for transferring labels from a label magazine for in-mold labeling prior to blow molding.

In carrying out the above object, label transfer apparatus constructed in accordance with the invention includes a rotary table that is rotatable about a central axis. A first rotary motor rotates the rotary table about the central axis. A transfer head is rotatable on the rotary table about a rotary axis that is fixed with respect to the table and spaced from the central axis such that table rotation moves the transfer head adjacent the label magazine which stores a stack of labels with an exposed end from which the labels are subsequently dispensed. The transfer head includes a pair of vacuum openings through which a vacuum is supplied. An actuator of the apparatus includes a second rotary motor, a rotary actuator member rotatively driven by the second rotary motor about the central axis independently of the rotary table, and a rotary connector extending between the rotary actuator member and the transfer head to rotate the transfer head with a rolling motion to engage one of the vacuum openings with the label at the exposed end of the label magazine and to initially pull an extremity of the label away from the label stack and thereby permit air to move behind the label, to subsequently pull an intermediate portion of the label away from the label stack and thereby permit more air to move behind the label, and to then engage the other vacuum opening with opposite extremity of the label to finally pull an opposite extremity of the label away from the label stack in a manner that permits high speed labeling.

To provide the high speed labeling, the label transfer apparatus preferably includes a plurality of the label transfer heads supported on the rotary table for rotary motion on the table adjacent the label magazine and for rotary movement with respect to the table under the impetus of the actuator. The actuator of the label transfer apparatus includes a rotary actuator member that rotates about a central rotary axis of the rotary table and also includes an endless belt that extends from the rotary actuator member to the label transfer heads to provide the rotation thereof with respect to the rotary table. At least one tension wheel is mounted on the rotary table with the belt extending thereover to provide tensioning of the belt, and preferably there are a pair of the tension wheels mounted for rotation on the rotary table adjacent the rotary actuator member. Each label transfer head on the rotary table preferably includes a second pair of vacuum openings one of which engages the label adjacent its first extremity to cooperate with said one vacuum opening of the first mentioned pair of vacuum openings to initially pull the label away from the label stack and the other of which engages the label adjacent its opposite extremity to cooperate with the other vacuum opening of the first pair of vacuum openings to finally complete the pulling of the label away from the label stack.

Another object of the present invention is to provide an improved method for transferring labels from a label magazine for in-mold labeling prior to blow molding.

In carrying out the immediately preceding object, the label transferring method is performed by rotating a rotary table by a first rotary motor about a central axis adjacent the label magazine which stores a stack of labels with an exposed end from which the labels are subsequently dispensed. A transfer head is rotatably supported on the rotary table about a rotary axis fixed with respect to the rotary table and spaced from the central axis. A rotary actuator member is rotated about the central axis by a second rotary motor independently of the rotary table and rotates the transfer head by a rotary connector that extends between the rotary actuator member and the transfer head. A vacuum is drawn through a pair of vacuum openings of the transfer head. The rotary table and the transfer head are rotated by the first and second rotary motors in opposite directions to engage one of the vacuum openings with the label at the exposed end of the label magazine to initially pull an extremity of that label away from the label magazine and thereby permit air to move behind the label, to subsequently pull an intermediate portion of the label away from the label stack and thereby permit more air to move behind the label, and to then engage the other vacuum opening with opposite extremity of the label to finally pull an opposite extremity of the label away from the label magazine in a manner that permits high speed labeling.

The method is preferably performed with a plurality of the label heads supported and rotated on the rotary table about associated fixed axes with respect to the table for movement therewith adjacent the label magazine and for rotary movement with respect to the table to provide the rolling motion that pulls each label from the label magazine. Each label transfer head is rotated with respect to the table by the rotary actuator member that rotates about the central axis of the rotary table and by the rotary connector that may be embodied by an endless belt that extends from the rotary actuator member to the label transfer heads. The label transfer method also involves tensioning of the endless belt by a tension wheel rotatably mounted on the rotary table and with the tensioning of the endless belt preferably provided by a pair of tension wheels rotatably mounted on the rotary table.

In the preferred practice of the label transfer method, a first vacuum opening of a second pair of vacuum openings of the transfer head initially also engages the label adjacent its first extremity to cooperate with said one vacuum opening of the first mentioned pair of vacuum openings to initially pull the label away from the label stack and another vacuum opening of the second pair subsequently also engages the label adjacent its opposite extremity to cooperate with the other vacuum opening of the first pair of vacuum openings to complete the pulling of the label away from the label stack.

DETAILED DESCRIPTION OF THE PREFERRED EMBODIMENTS

Figure 1:
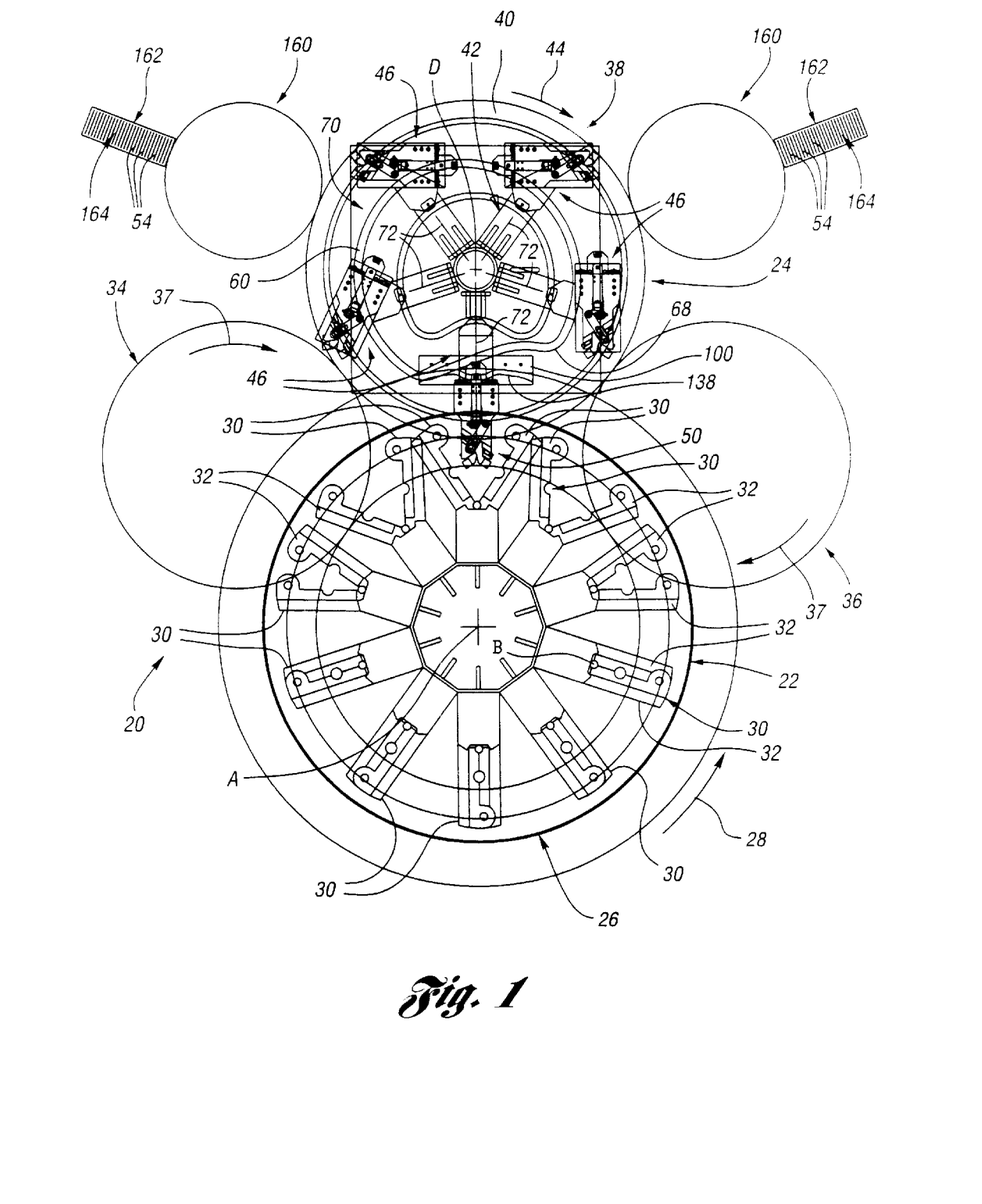
FIG. 1 is a top plan view of a plastic blow molding system that embodies the present invention.

With reference to FIG. 1, a plastic blow molded system generally indicated by 20 embodies the present invention and includes a rotary plastic blow molding machine 22 and an in-mold labeler 24 for providing labels to the blow molding machine prior to blow molding as is hereinafter more fully described. The apparatus of the blow molding system 20 and its method of operation will be described in an integrated manner to facilitate an understanding of all aspects of the invention.

Blow molding machine 22 illustrated in FIG. 1 includes a rotary mold wheel 26 that is rotatable about a mold wheel axis A in a counterclockwise direction as illustrated by arrow 28. A plurality of molds 30 (ten as shown) are supported on the mold wheel 26 for counterclockwise rotary movement about the mold wheel axis A and mold sections 32 of the molds are movable about associated mold axes B between closed positions as shown at the lower portion of FIG. 1 and open positions as shown at the upper portion adjacent the in-mold labeler 24. During such opening and closing movements, the mold sections 32 are positioned symmetrically about mold parting planes C that extend from the mold wheel axis A through the associated mold axes B.

With continuing reference to FIG. 1, the blow molding system 20 includes a supply station 34 where heated plastic preforms are cyclically supplied to the adjacent open molds 30 which then close for the blow molding operation as the mold wheel 26 continues its counterclockwise rotation. After the mold closing and the blow molding, the blow molded container cools and the mold wheel continues to rotate counterclockwise to a delivery station 36 where the molds open to permit removal of the blow molded container. As the mold wheel continues to rotate counterclockwise, each open mold leaving the delivery station 36 is supplied one or more labels by the in-mold labeler 24 as is hereinafter more fully described prior to moving to the supply station 34 where the next heated plastic preform is supplied to the open mold prior to its closing as the cycles continue. Both the supply station 34 and the delivery station 36 operate in a conventional rotary manner with supply and delivery wheels rotating clockwise as shown by arrows 37 to supply the preforms and receive the blow molded containers which can be at a very high production rate of thousands and even ten thousands of containers per hour. As is hereinafter more fully described, the in-mold labeler 24 is constructed and operates to provide high speed supply of the labels to the molds even at these relatively high production rates where they may be only a second or a fraction of a second to perform the in-mold labeling operation.

Figure 2:
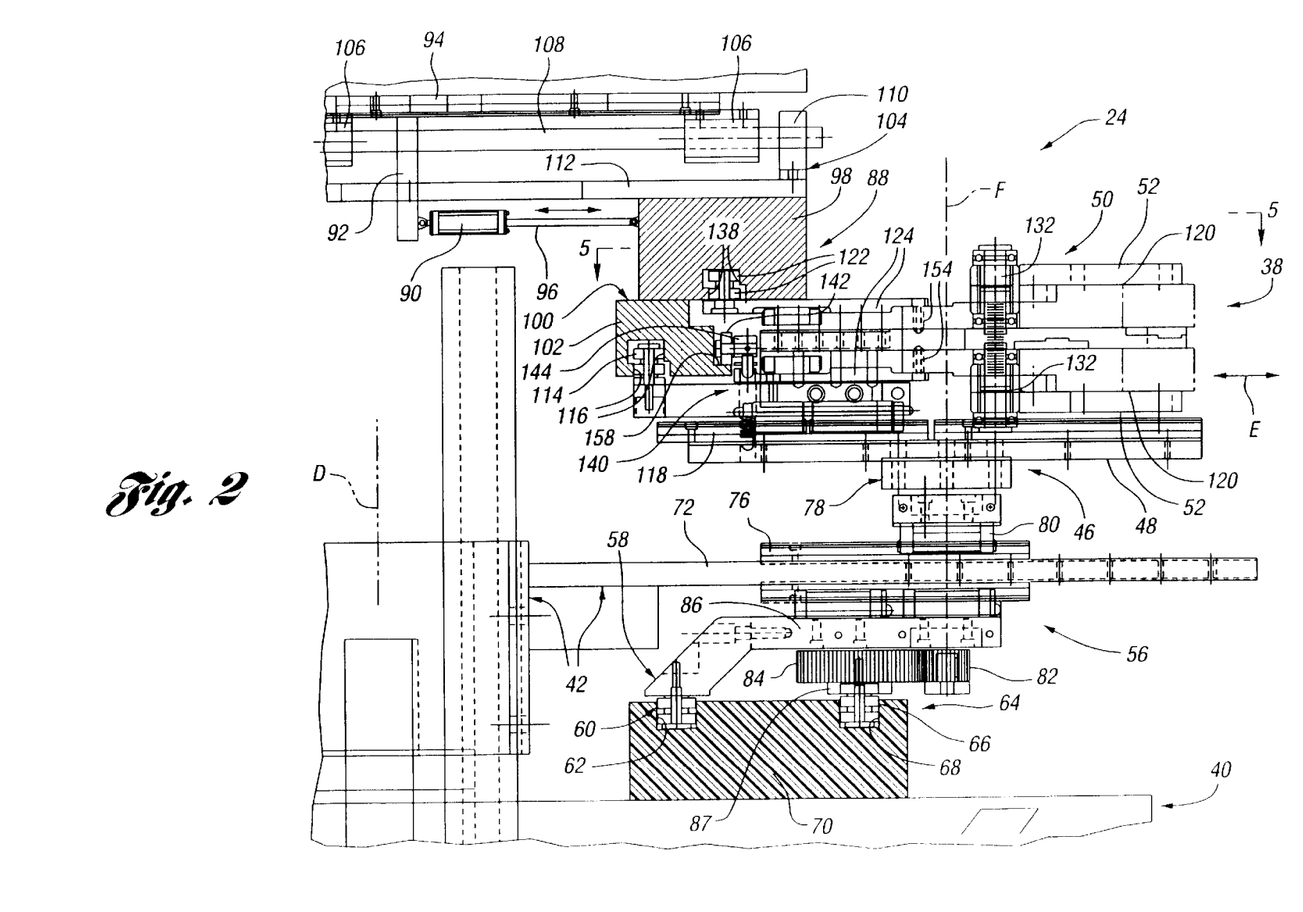
FIG. 2 is a partially sectioned view taken along the direction of line 2—2 in FIG. 1 to illustrate an in-mold labeler of the system.
Figure 5:
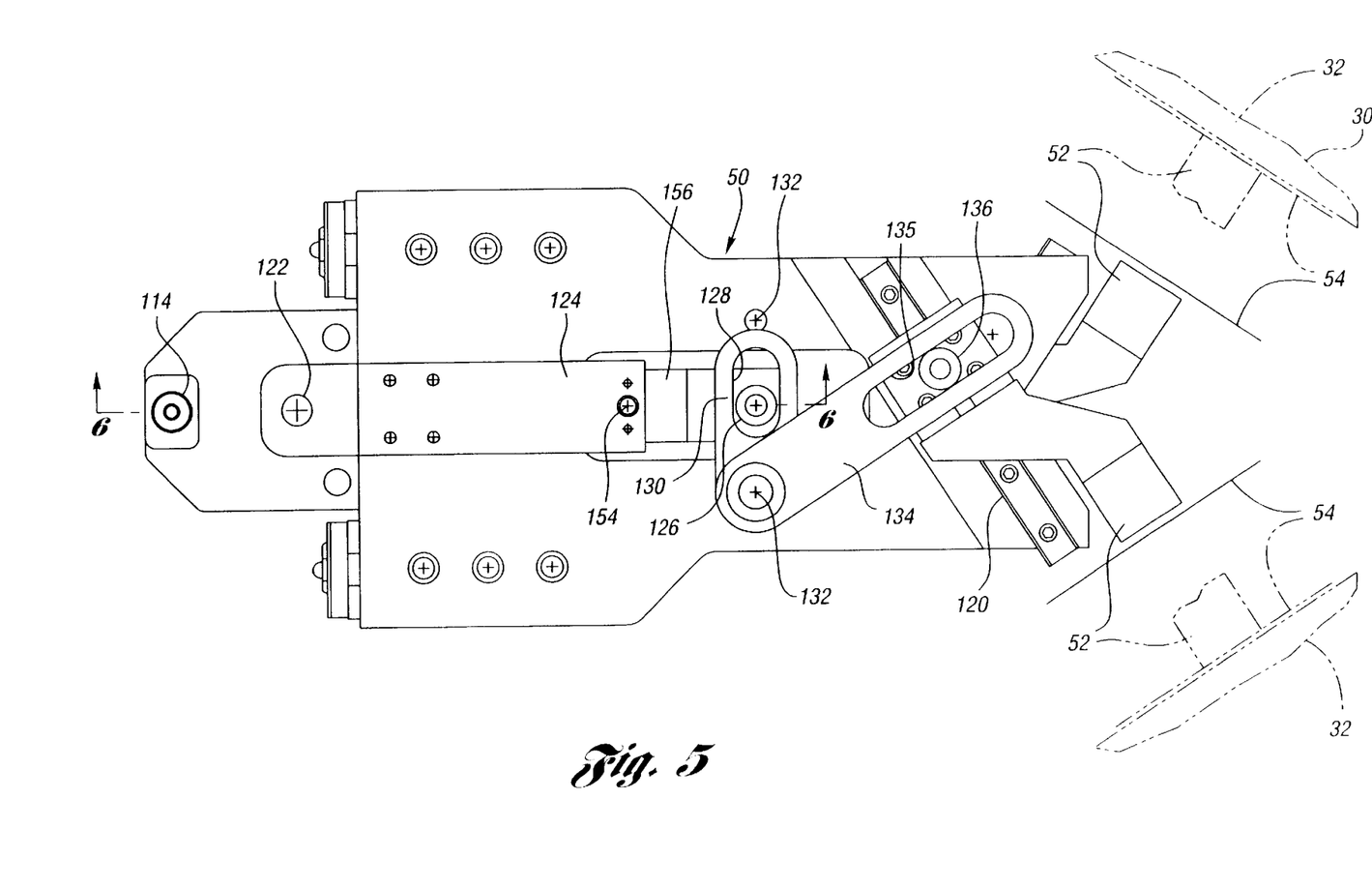
FIG. 5 is an enlarged top plan view taken along the direction of line 5—5 in FIG. 2 to illustrate the construction of the label dispensing head and label carriers thereof that are moved from retracted solid line indicated positions to phantom line indicated label transfer positions to provide the label depositing operation.

With combined reference to FIGS. 1 and 2, the in-mold labeler 24 includes a dispensing assembly 38 having a base 40 and a dispensing wheel 42 that rotates clockwise as shown by arrow 44 in FIG. 1 about a dispensing wheel axis D that extends parallel to the mold wheel axis A. The dispensing wheel 42 includes a plurality of dispensing head assemblies 46, as shown in FIG. 1, each of which as shown in FIG. 2 includes a support 48 and a dispensing head 52 mounted on the support for movement along a dispensing head axis E of the support between a pick position shown in FIG. 2 and a place position shown at the six o'clock location of the dispensing wheel 42 in FIG. 1. Each dispensing head 46 as illustrated in FIGS. 2 and 5 includes at least one label carrier 52 for carrying an associated label 54 to be deposited within an associated mold section 32 of the adjacent open mold 30 to perform the in-mold labeling operation. As illustrated, each dispensing head 50 includes a pair of the label carriers 52 so that a pair of labels 54 can be provided to the adjacent open mold such that labels will be provided to opposite sides of the blow molded container. In accordance with conventional in-mold labeling operation, each label carrier 52 is supplied a vacuum for securing the label 54 until being transferred to the mold 30 whereupon the label carrier vacuum is terminated and a vacuum drawn at the mold secures the label in position in preparation for the blow molding operation.

Figure 3:
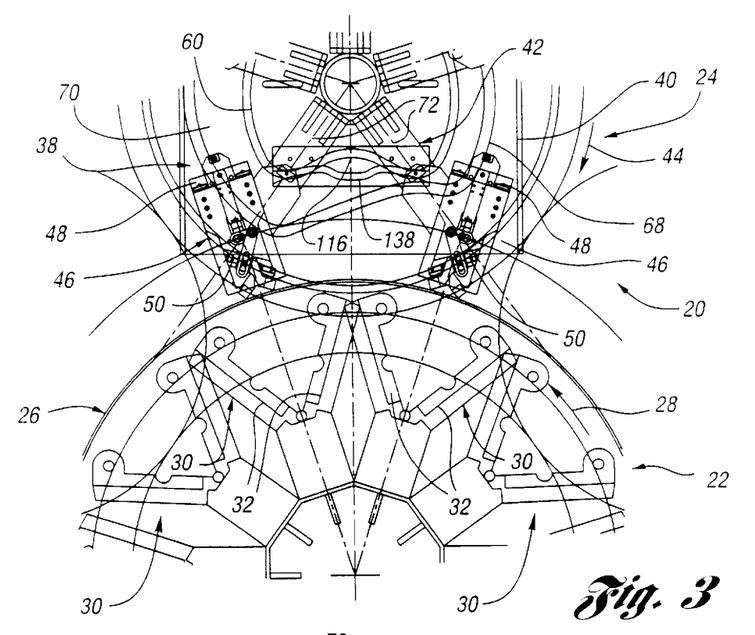
FIG. 3 is a partial plan view that illustrates the manner in which a support of a label dispensing head assembly is moved along the rotary path of a mold wheel during a label depositing operation with two label head assemblies illustrated shown at the beginning and end of the rotary movement of the label depositing operation.
Figure 4:
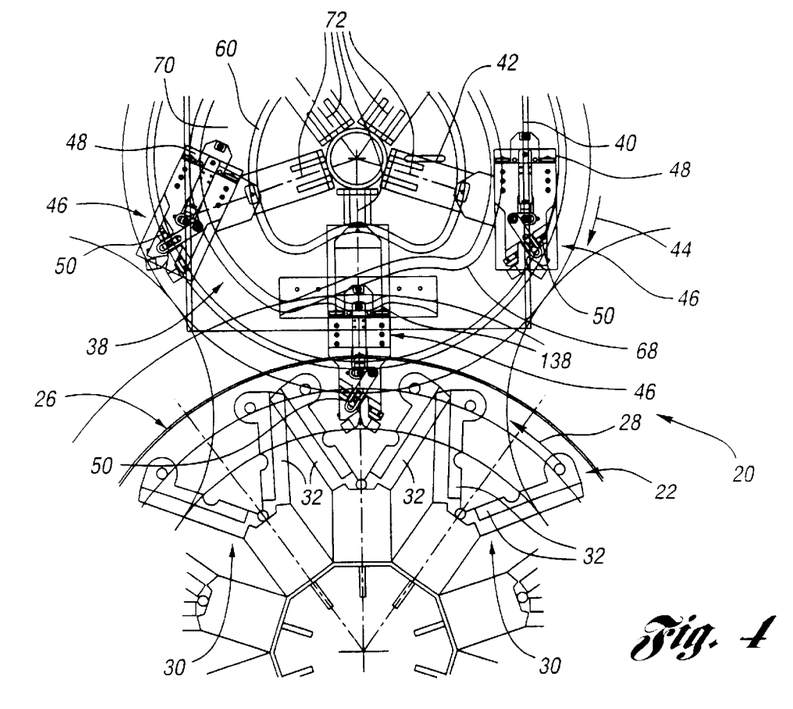
FIG. 4 is a view similar to FIG. 3 showing one of the label head dispensing assemblies with its dispensing head moved inwardly to an adjacent open mold to provide the label depositing operation to transfer labels to the open mold.

With reference to FIG. 2, the in-mold labeler 24 includes an actuator 56 for moving the support 48 of each dispensing head assembly 38 during the label depositing operation along the rotary path $30_p$ (FIG. 1) of the adjacent open mold about the mold wheel axis A. The actuator 56 shown in FIG. 2 also angularly positions the support 48 of the dispensing head assembly about a support axis F during the label depositing operation illustrated in FIGS. 3 and 4 such that the dispensing head axis E (FIG. 2) moves in alignment with the moving mold parting plane C of the adjacent open mold as the dispensing head 50 is moved between the pick position shown in FIG. 3 and the place position within the open mold as shown in FIG. 4 where the label depositing takes place in the adjacent open mold. The movement of the dispensing head support 48 and hence the dispensing head 50 thereon along the rotary path of the adjacent open mold and the angular alignment of the support and the dispensing head along the mold parting plane provide a greater time for the label depositing to take place and also provide the proper angular alignment so the labels can be deposited at the proper orientation during the in-mold labeling.

With reference back to FIGS. 1 and 2, the actuator 56 that controls the movement of the dispensing head assembly supports 48 includes a first cam mechanism 58 that moves each dispensing head during the label depositing operation along the rotary path of the adjacent open mold. This first cam mechanism 58 includes a cam follower 60 (FIG. 2) of each dispensing head assembly 46 and a continuous cam 62 that is on the base 40 and extends as shown in FIG. 1 about the dispensing wheel axis D. As shown in FIG. 2, the cam 62 receives the cam follower 60 so as to provide the movement of the associated support 48 along the rotary path of the adjacent open mold of the mold wheel. The actuator 56 also includes a second cam mechanism 64 that angularly positions the support 48 of the dispensing head assembly 38 about the support axis F such that the dispensing head axis E of the support moves in alignment with the mold parting plane of the adjacent open mold as the label carriers 52 are moved on the support by the dispensing head during the label depositing operation from the pick position to the place position to deposit the label within the adjacent open mold. As previously mentioned, the movement of the support 48 along the rotary path of the adjacent open mold and the angular positioning of the support so that the dispensing head axis E moves in alignment with the mold parting plane provide increased time for the label deposition operation and also provide proper alignment thereof as the labels are deposited. The second cam mechanism includes a second cam follower 66 shown in FIGS. 2 and 9 and a continuous cam 68 that extends around the dispensing wheel axis D as shown in FIG. 1. Both the continuous cam 62 of the first cam mechanism 58 and the continuous cam 68 of the second cam mechanism 64 are illustrated in FIG. 2 as being defined within a single cam member 70 mounted on the base 40 of the dispensing assembly 38; however, it should be appreciated that these continuous cams could be provided on separate cam members mounted on the base instead of a single cam member. The complete operation of the angular positioning of the support 48 by the second cam member 64 is hereinafter more fully described.

Figure 9:
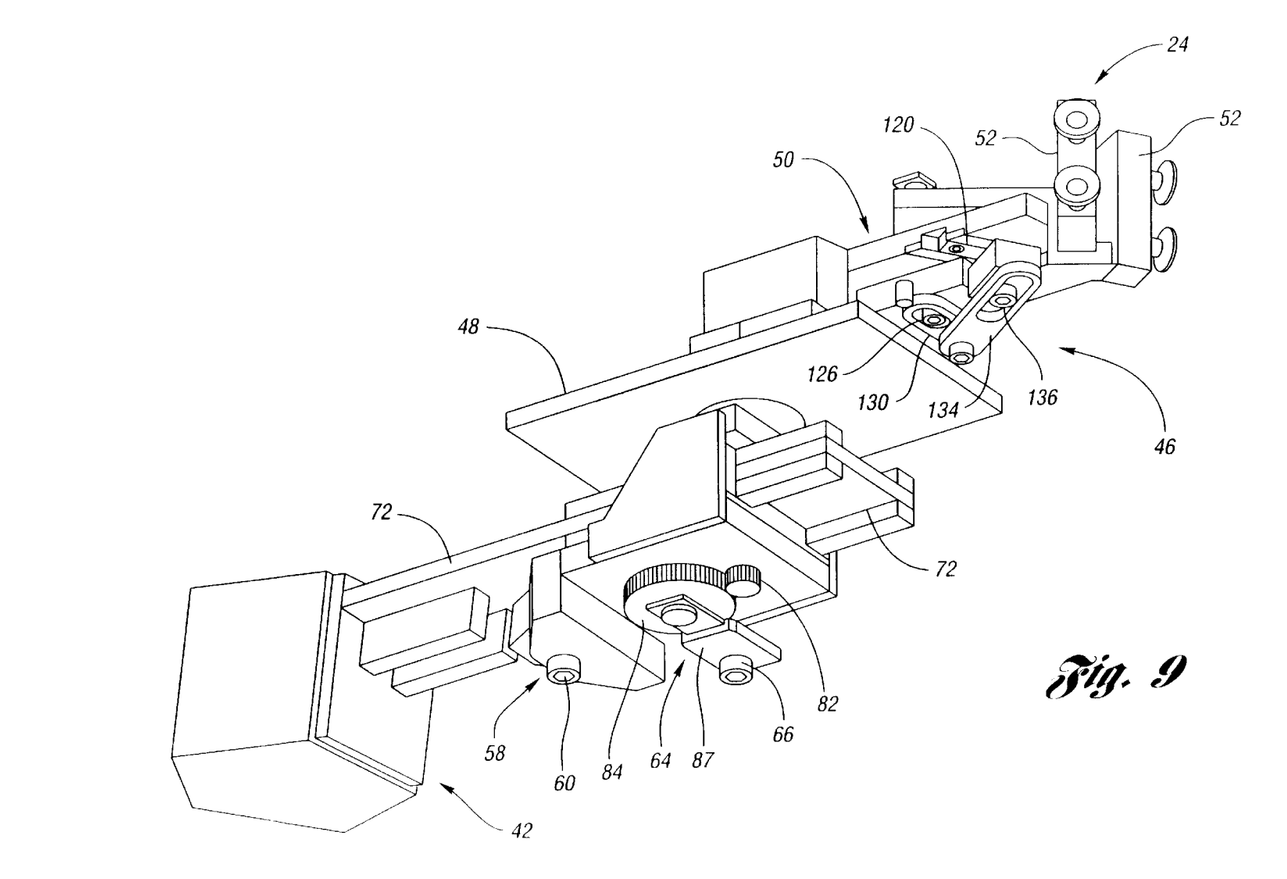
FIG. 9 is a somewhat schematic perspective view illustrating a portion of a dispensing wheel of the in-mold labeler of the blow molding system and shows the dispensing head assembly and its support and label dispensing head.

As illustrated in FIG. 1, the dispensing wheel 42 of the in-mold labeler 24 includes a plurality of tracks 72, five as illustrated, that extend radially from the dispensing wheel axis D and are respectively associated with the dispensing head assemblies 46. Each dispensing head assembly 46 as shown in FIG. 2 has lower and upper slide mounts 74 and 76 that support the dispensing head assembly for movement along the associated dispensing wheel track 72 in a radial direction with respect to the dispensing wheel axis D. The first cam mechanism 58 including its cam follower 60 and base mounted cam 62 provide movement of the dispensing head assembly 46 along the dispensing wheel track 72 radially with respect to the dispensing wheel axis D in order to position the dispensing head assembly such that its support axis F moves along the rotary path of the adjacent open mold about the mold wheel axis A as the label depositing takes place. A pivotal mount 78 pivotally mounts the support 48 of each dispensing head assembly 46 on the lower and upper slide mounts 74 and 76 for angular movement about the support axis F. The pivotal mount 78 includes a vertical shaft 80 whose upper end is pivotally fixed to the support 48 and whose lower end is fixed to a gear 82 that as shown in FIG. 9 is meshed with a second gear 84 which is rotatively mounted on a connection member 86 that is secured to the lower track member 74 as shown in FIG. 2. The connection member 86 also mounts the first cam follower 60 of the first cam mechanism 58. An arm 87 fixed on gear 84 mounts the second cam follower 66. The positioning of the second cam follower 66 within the second cam 68 thus controls the rotary position of the gear 84 whose meshing with the gear 82 on the vertical shaft 80 controls the angular positioning of the dispensing head support 48 about support axis F so as to thereby control the location of its dispensing head axis E along which the dispensing head 50 moves between the pick and place positions previously described.

As illustrated in FIG. 2, the in-mold labeler 24 includes a third cam mechanism 88 having an operator 90 such as an electric servomotor or an air cylinder, etc. for moving each dispensing head 50 with its label carriers 52 thereon on the associated support 48 between the pick position and the place position as shown in FIG. 5 where the label carriers are positioned within the adjacent open mold 30 to transfer the labels 54 carried thereby to the mold. More specifically, the operator 90 is mounted by a suitable connector 92 to an upper portion 94 of the dispensing wheel base. The operator 90 has a movable piston connecting rod 96 that is suitably connected to an upper cam portion 98 of a cam member 100 that also includes a lower cam portion 102. A slideway 104 supports the cam member 100 and its upper and lower cam portions 98 and 102 for movement along a direction aligned with the mold wheel and dispensing wheel axes A and B (FIG. 1). More specifically, the slideway 104 includes mounts 106 on the upper base portion and a slidable rod 108 received by these mounts supports hangers 110 (only one shown) that support a connection member 112 on which the cam member 100 is supported at its upper cam portion 98.

As illustrated in FIG. 2, each dispensing head 50 includes a dispensing head cam follower 114 and the lower portion 102 of the cam member 100 includes a dispensing head cam surface 116. As each dispensing head 50 is moved clockwise on the dispensing wheel toward the fixed base mounted cam 100 as illustrated in FIG. 1, the dispensing head cam follower 114 shown in FIG. 2 moves into engagement with the dispensing cam surface 116 which extends along the entire length of the cam. The dispensing head 50 is mounted on the dispensing head support 48 by a slideway 118 for movement along the dispensing head axis E. The engagement of the dispensing head cam follower 114 with the dispensing head cam surface 116 of the lower portion 102 of cam member 100 provides control of the movement of the dispensing head 50 under impetus of the operator 90. More specifically, the operator 90 moves the dispensing head from the pick position to its place position which is illustrated in FIG. 1 at the six o'clock location where the in-mold labeling operation is performed. The operator 90 illustrated in FIG. 2 then moves the cam member 100 back to again position the dispensing head 50 in the pick position. After continued clockwise movement, the dispensing head 50 then has its dispensing head cam follower 114 disengaged with the dispensing head cam surface 116 of the cam member 100.

With combined reference to FIGS. 2 and 5, each of the label carriers 52 is mounted on the dispensing head 50 by an associated track 120 for movement between the solid line indicated retracted position and the phantom line indicated extended position where the label 54 carried thereby is transferred to the adjacent mold 30 at one of its mold sections 32 as previously described. Each dispensing head 50 includes a label carrier cam follower 122 mounted on one end of a connection member 124 whose other end supports a link cam 126 that is received by a slot 128 in an actuator link 130 that is pivotally supported on the dispensing head 50 by a pivotal connection 132 and which is pivotally fixed to an actuating link 134 that has a slot 135 that receives an actuating cam 136 mounted on the adjacent label carrier 52.

As illustrated in FIG. 2, the upper portion 98 of the cam member 100 includes a label carrier cam surface 138 that receives the label carrier cam follower 122 as the dispensing head is moved on the dispensing wheel clockwise as illustrated in FIG. 1 toward the cam member 100. This label carrier cam surface 138 adjacent the six o'clock position of FIG. 1 is contoured to move the label carrier cam follower 122 shown in FIG. 2 in a radial outward direction with respect to the dispensing wheel and through the connection member 124 illustrated in FIG. 5 and the actuating links 130 and 134 and the actuating cams 126 and 136 moves the label carriers 52 between the retracted and label transfer positions previously described to perform the in-mold labeling operation. After the mold 30 receives the labels 54 as illustrated in FIG. 5, the label carrier cam follower 122 is cammed back to thereby move the label carriers 52 back to the retracted positions as the operator 90 shown in FIG. 2 concomitantly moves the dispensing head 50 back from the place position shown in FIG. 1 to the pick position where the labels are supplied to the label carriers as is hereinafter more fully described.

Figure 6:
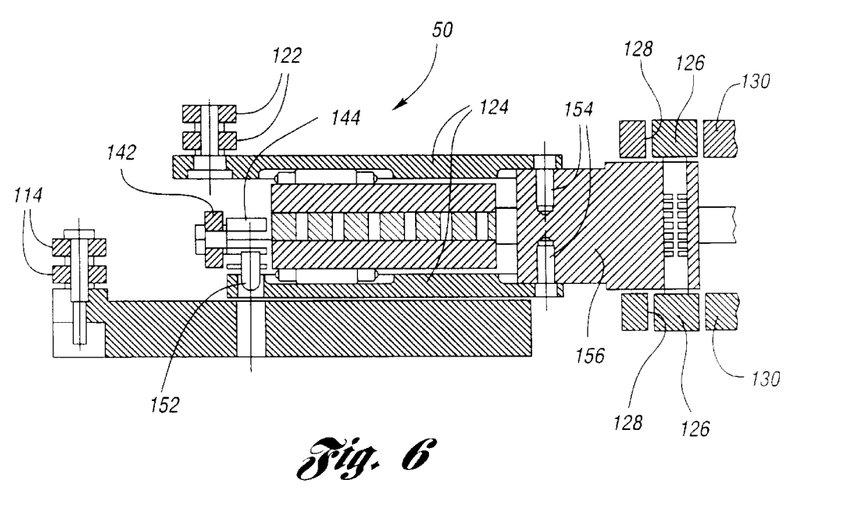
FIG. 6 is a sectional view taken along the direction of line 6—6 in FIG. 5 to illustrate the construction of the dispensing head and cam followers thereof that control its operation.
Figure 7:
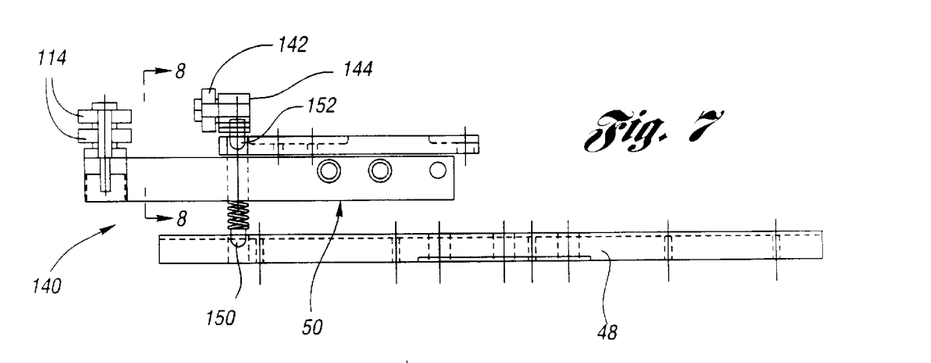
FIG. 7 is a view taken generally in the same direction as FIG. 6 to further illustrate the construction of a lock mechanism that locks the dispensing head against movement along a support of the dispensing head assembly.
Figure 8:
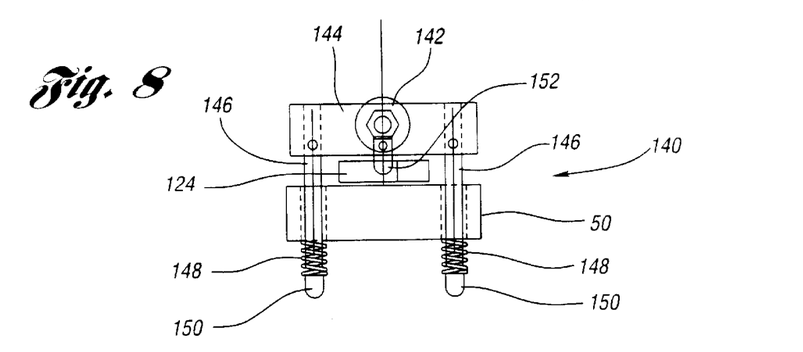
FIG. 8 is an elevational view taken in the direction of line 8—8 in FIG. 7 to further illustrate the construction of the lock mechanism.

With reference to FIG. 1, as each dispensing head assembly 46 moves clockwise from the cam member 100 at the lower six o'clock position, a lock mechanism 140 illustrated in FIGS. 6–8 locks the dispensing head 50 from movement on the support 48 and also locks the connection members 124 from movement so as to thereby prevent movement of the label carriers under the operation of the actuating cams and actuating links as previously described. More specifically, the lock mechanism 140 includes an unlocking cam follower 142 that is mounted on a member 144 which, as shown in FIG. 8, supports a pair of rods 146 that extend downwardly through the dispensing head 50 and have lower ends connected by springs 148 to a pair of first lock members 150. When the unlocking cam follower 142 is disengaged from the cam 100 shown in FIG. 1, the pair of first lock members 150 shown in FIG. 8 extend downwardly and are received by holes in the support 48 of the dispensing head assembly so as to prevent the movement of the dispensing head 50 along the support between the pick and place positions as previously described.

The lock mechanism 140 illustrated in FIGS. 6–8 also includes a single second lock member 152 that extends downwardly from the member 144 and is received within a hole in the lower connection member 124 as shown in FIG. 6. Since both lower and upper connection members 124 are secured to each other by bolts 154 threaded into a connection member extension 156 on which the actuating cams 126 are mounted, the positioning of the second lock member 152 within the hole of the lower connection member 124 secures both of these connection members and thereby prevents the cam and actuating link movement that moves the label carriers. As such, the label carriers 52 are then secured in their retracted position which is illustrated by solid line representation in FIG. 5.

With reference to FIG. 2, the lower portion 102 of the cam member 100 includes an unlocking cam surface 158 which is engaged by the unlocking cam follower 142 to provide unlocking actuation of the lock mechanism 140 when the dispensing head 50 moves clockwise toward the cam 100 at its six o'clock position shown in FIG. 1. This engagement of the unlocking cam follower 142 with the unlocking cam surface 158 of cam 100 moves the member 144 shown in FIGS. 6–7 upwardly so as to move the pair of first lock members 150 out of engagement with the support 48 and to also move the single second lock member 152 out of engagement with the lower connection member 124. At the same time that this unlocking takes place, the dispensing head cam follower 114 and the label carrier cam follower 122 shown in FIG. 2 move into engagement with the dispensing head cam surface 116 and the label carrier cam surface 138, respectively, so as to control the positioning of the dispensing head 50 and the movement of the label carriers 52 in the manner previously described.

With reference to FIG. 1, schematically illustrated a pair of label transfer mechanisms 160 are positioned adjacent the in-mold labeler 24 and each is located adjacent an associated label magazine 162 that holds a stack 164 of labels 54. As is hereinafter more fully described, the labels 54 are transferred by the transfer mechanism 160 from the label magazine 162 and move to a generally diametrically opposite location of the transfer mechanism where the labels are then transferred to one of the label carriers of an adjacent dispensing head as it rotates on the dispensing wheel 42 past the label transfer mechanism. During such movement, the first and second cam mechanisms 58 and 62 position the adjacent dispensing head 50 so that the label carrier is properly positioned for receiving the label from the label transfer mechanism 160. More specifically, the cam mechanisms initially position the dispensing head so that one of the label carriers receives a label from the left label transfer mechanism 160 illustrated. After continued clockwise rotation the dispensing head is moved angularly so its other label carrier receives the label from the right label transfer mechanism 160. After receiving the pair of labels, the dispensing head 50 then continues to rotate clockwise on the dispensing wheel 42 for the in-mold label depositing operation as previously described with respect to the blow molding machine 22.

Figure 10:
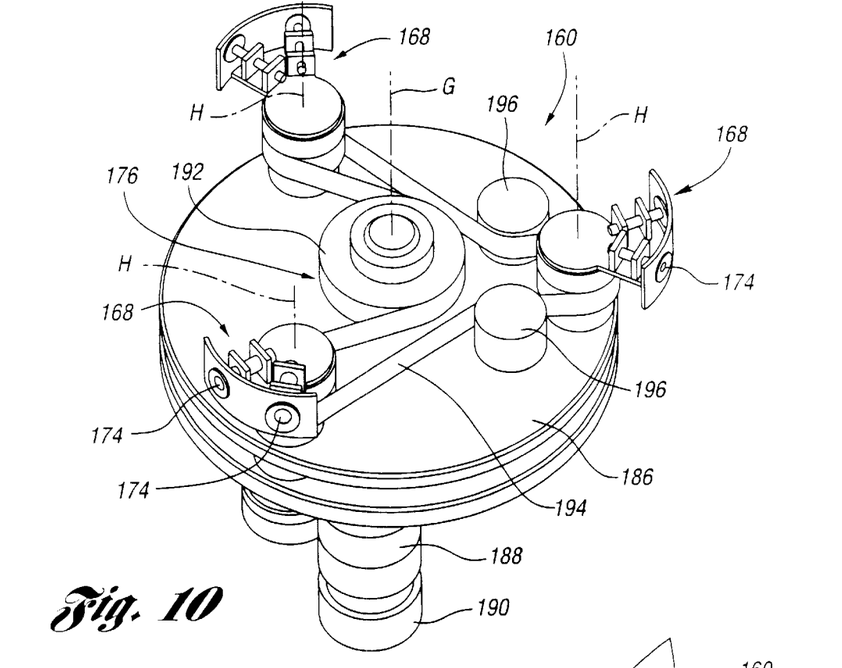
FIG. 10 is a perspective view that illustrates label transfer apparatus of the blow molding system for use in transferring labels from a label magazine to the plastic blow molding machine of the system for in-mold labeling prior to blow molding.

With reference to FIG. 10, each of the label transfer mechanisms 160 is constructed as illustrated and includes at least one transfer head 168. Actually as illustrated, there are three of the transfer heads 168 so as to have the capability of a greater speed of label transfer.

Figure 11:
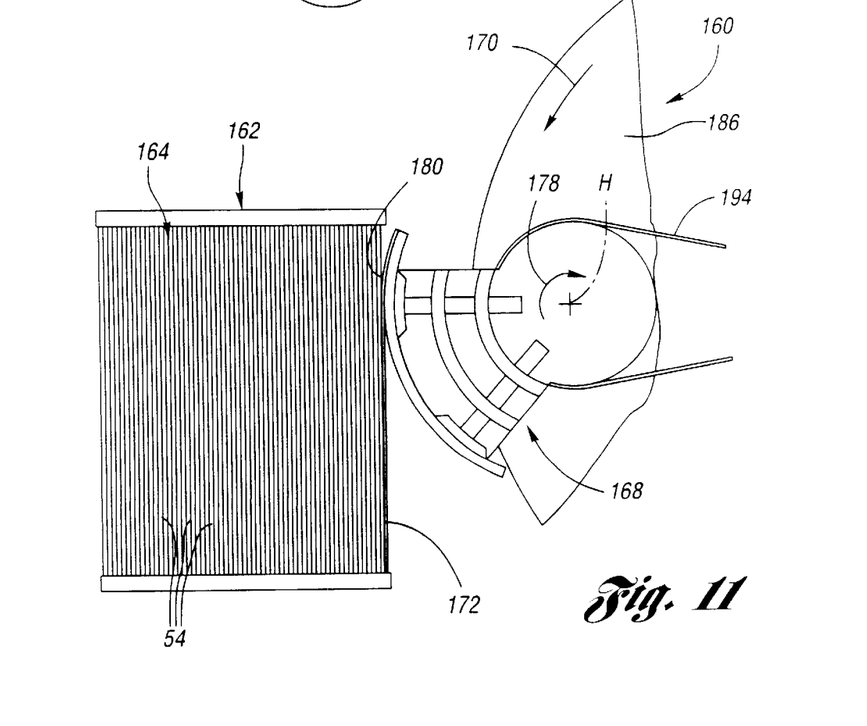
FIG. 11 is a partial view illustrating the manner in which a dispensing head of the label transfer apparatus is actuated to execute a rolling motion upon initially removing a label from the adjacent label magazine.
Figure 12:
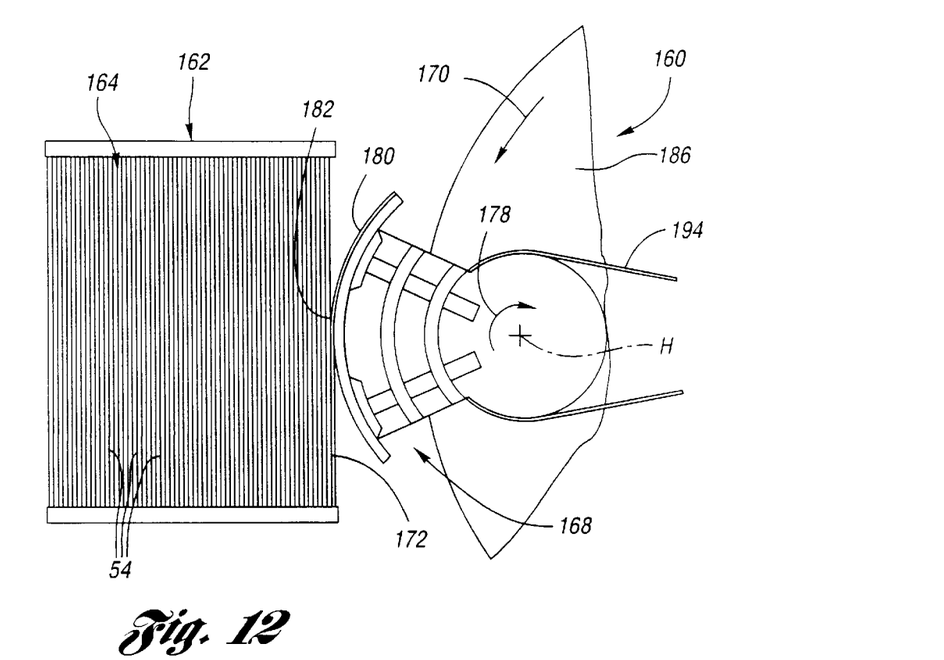
FIGS. 12 and 13 are partial views that illustrate the label transfer apparatus at progressively later stages of the label removal operation.
Figure 13:
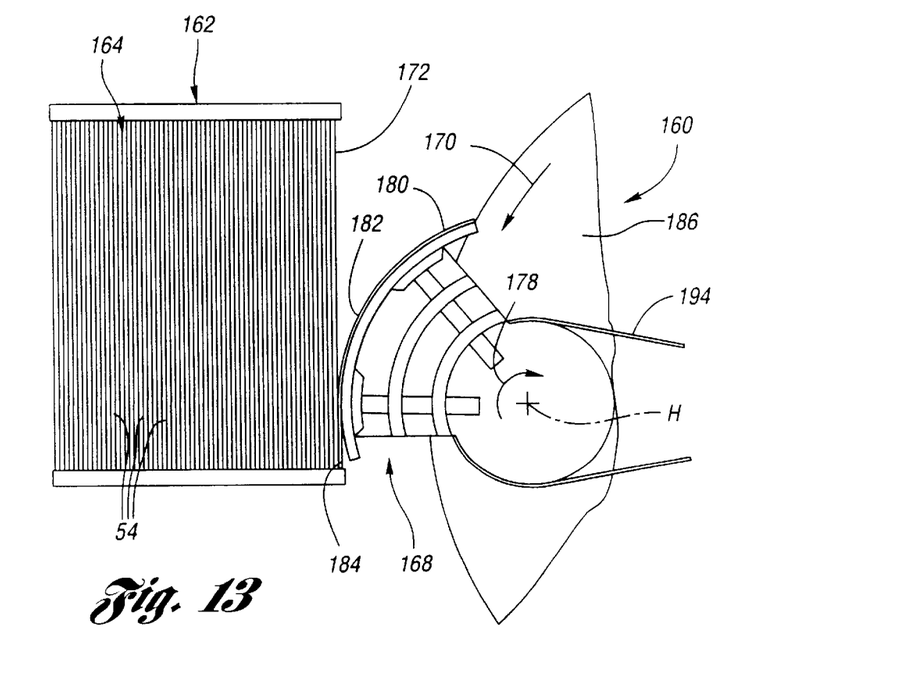

As illustrated in FIGS. 11–13, the label transfer mechanism 160 moves each transfer head 168 as shown by arrow 170 adjacent the associated label magazine 162 adjacent an exposed end 172 of the label stack 164. The transfer head as shown in FIG. 10 includes a pair of the vacuum openings 174. The label transfer mechanism 160 that supports the transfer heads 168 includes an actuator collectively indicated by 176 for moving the transfer head with a rolling motion as shown by arrow 178 in FIGS. 11–13. This rolling motion is in the opposite direction as the general movement of the transfer head as illustrated by arrow 170 and causes the transfer head to engage one of the vacuum openings 174 with an extremity 180 of the exposed label to initially pull the extremity 180 of the exposed label 54 away from the label stack 164 and thereby permits air to move behind that label. Thereafter as illustrated in FIG. 12, the transfer head 168 continues its rolling movement and subsequently pulls an intermediate portion 182 of the label away from the label stack and permits more air to move behind the label. The continued rolling movement of the transfer head 168 as shown in FIG. 13 finally engages the other vacuum opening 174 with an opposite extremity 189 of the label 54 and pulls the opposite extremity 184 of the label 54 away from the label stack 164. This rolling motion of the transfer head 168 and the manner in which the label is pulled from the stack first at one extremity, then at the intermediate portion, and finally at the opposite extremity permits air to rapidly move behind the label and thereby permits high speed label transferring from the label magazine 162.

With reference to FIG. 10, the label transfer mechanism 160 includes a rotary table 186 that supports each of the label transfer heads 168 for rotary movement with the table about a central axis G in order to support the transfer heads for rotary movement with the table along the direction of arrow 170 illustrated in FIGS. 12–13. Furthermore, each transfer head 168 rotates with respect to the table about an associated rotary axis H fixed with respect to the table. Thus, the rotation of the table 186 moves the transfer heads 168 laterally past the label stack 164 and the transfer heads rotate with respect to the table as the labels are pulled from the label magazine 162.

The label transfer mechanism 160 illustrated in FIG. 10 includes a suitable rotary motor 188 that rotates the rotary table 186 and also includes a rotary motor 190 that rotates a rotary actuator member 192 about the table axis G but independently of the rotary table 186. Furthermore, the actuator 176 includes a rotary connector that may be embodied by an endless belt 194 that extends from the rotary actuator member 192 to the label transfer heads 168 to provide rotation thereof with respect to the rotary table as previously described in connection with FIGS. 12–13. Furthermore, the label transfer mechanism 160 also includes at least one tension wheel 196 mounted for rotation on the rotary table 186 with the belt 194 extending thereover to provide proper tensioning of the belt. More specifically, there are actually a pair of the tension wheels 196 mounted for rotation on the rotary table 186 adjacent the rotary actuator member 192 with the belt 194 extending over the tension wheels to provide tensioning of the belt.

The pair of the vacuum openings 174 provide greater control of the label removal operation by the rolling motion involved than would be possible with only one vacuum opening.

Figure 14:
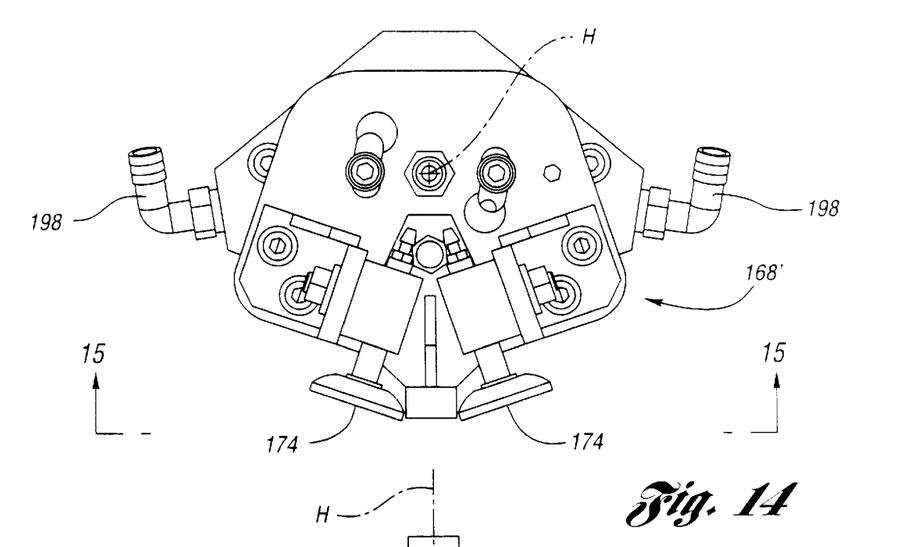
FIG. 14 is a top plan view illustrating another construction of the dispensing head of the label transfer apparatus.
Figure 15:
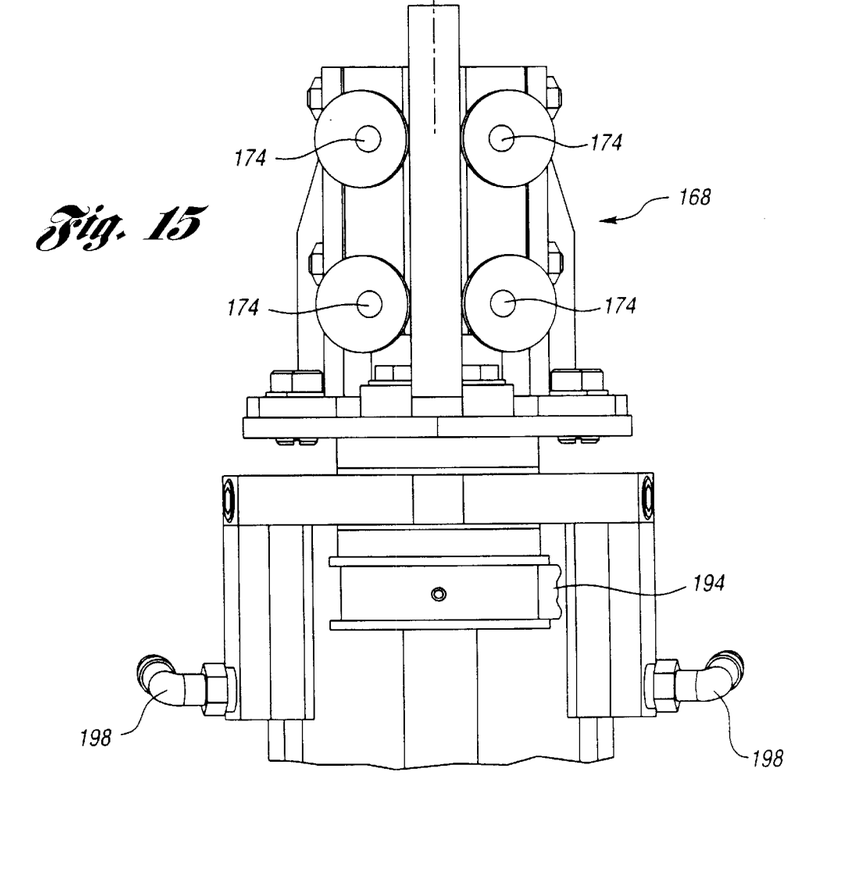
FIG. 15 is a view taken along the direction of line 15—15 in FIG. 14 to further illustrate the construction of the dispensing head of the label transfer apparatus.

As illustrated in FIGS. 14 and 15, each label transfer head 168' can also have a second pair of vacuum openings 174 spaced axially along the direction of the rotary axis H about which rotation takes place with respect to the table in order to provide greater securement of the labels along that dimension. Suitable vacuum inlets 198 are communicated with the vacuum openings 174 through the label transfer head 168' to provide the label procurement during the transfer of the labels from the associated label transfer head to the dispensing head of the in-mold labeler previously described.

It should be appreciated that the in-mold labeler 24 is most operable to provide its high speed in-mold labeling operation when utilized with the type of transfer mechanisms 160 illustrated for supplying the initial transfer of the labels from the label magazines to the dispensing heads for the eventual transfer to the molds. However, it is also possible for the in-mold labeler 24 to have its label carriers receive the labels directly from label magazines even though the use of the intermediate transfer mechanisms is preferred as mentioned. Likewise, while the transfer mechanisms 160 are disclosed as transferring the labels from the label magazines to the dispensing heads for the subsequent in-mold label operation, other adaptations could also be provided where the labels are transferred by the transfer mechanisms from the label magazines directly to the molds.

Thus, while the preferred embodiment and operation thereof have been described in detail, those familiar with the art to which this invention relates will recognize various alternative designs and embodiments for practicing the invention as defined by the following claims.

What is claimed is:

1. Label transfer apparatus for use in transferring labels from a label magazine for in-mold labeling prior to blow molding, the label transfer apparatus comprising:

a rotary table that is rotatable about a central axis;

a first rotary motor that rotates the rotary table about the central axis;

a transfer head that is rotatable on the rotary table about a rotary axis that is fixed with respect to the table and spaced from the central axis such that table rotation moves the transfer head adjacent the label magazine which stores a stack of labels with an exposed end from which the labels are sequentially dispensed;

the transfer head including a pair of vacuum openings through which a vacuum is supplied; and an actuator including a second rotary motor, a rotary actuator member rotatively driven by the second rotary motor about the central axis independently of the rotary table, and a rotary connector extending between the rotary actuator member and the transfer head to rotate the transfer head with a rolling motion and engage one of the vacuum openings with the label at the exposed end of the label magazine to initially pull an extremity of that label away from the label stack and thereby permit air to move behind the label, to subsequently pull an intermediate portion of the label away from the label stack and thereby permit more air to move behind the label, and to then engage the other vacuum opening of the transfer head with the opposite extremity of the label to finally pull an opposite extremity of the label away from the label stack in a manner that permits high speed labeling.

2. Label transfer apparatus as in claim 1 which includes a plurality of the label transfer heads supported on the rotary table for rotary movement on the table adjacent the label magazine and for rotary movement with respect to the table under the impetus of the actuator.

3. Label transfer apparatus as in claim 2 wherein the rotary connector is embodied by an endless belt that extends from the rotary actuator member to the label transfer heads to provide the rotation thereof respect to the rotary table.

4. Label transfer apparatus as in claim 3 further including at least one tension wheel mounted for rotation on the rotary table with the belt extending thereover to provide tensioning of the belt.

5. Label transfer apparatus as in claim 4 wherein there are a pair of the tension wheels mounted for rotation on the rotary wheel adjacent the rotary actuator member with the belt extending thereover to provide tensioning of the belt.

6. Label transfer apparatus as in claim 2 wherein each label transfer head on the rotary table includes a second pair of vacuum openings one of which engages the label adjacent its first mentioned extremity to cooperate with said one vacuum opening of the first mentioned pair of vacuum openings to initially pull the label away from the label stack and the other of which engages the label adjacent its opposite extremity to cooperate with said other vacuum opening of the first mentioned pair of vacuum openings to finally complete the pulling of the label away from the label stack.

7. Label transfer apparatus for use in transferring labels from a label magazine for in-mold labeling prior to blow molding, the label transfer apparatus comprising:

a rotary table that is rotatable about a central axis;

a first rotary motor that rotates the rotary table about the central axis;

a plurality of transfer heads each of which is rotatably mounted on the rotary table for movement thereof about an associated rotary axis that is fixed with respect to the table and spaced from the central axis such that table rotation moves the transfer head adjacent the label magazine which stores a stack of labels with an exposed end from which the labels are sequentially dispensed;

each transfer head including a pair of vacuum openings through which a vacuum is supplied; and an actuator including a second rotary motor, a rotary actuator member rotatively driven by the second rotary motor about the central axis independently of the rotary table, and a rotary connector extending between the rotary actuator member and each transfer head to rotate the transfer heads relative to the table with a rolling motion and engage one of the vacuum openings thereof with the label at the exposed end of the label magazine and to initially pull an extremity of that label away from the label stack and thereby permit air to move behind the label, to subsequently pull an intermediate portion of the label away from the label stack and thereby permit more air to move behind the label, and to finally engage the other vacuum opening of each transfer head with the label to pull an opposite extremity of the label away from the label stack in a manner that permits high speed labeling.

8. Label transfer apparatus for use in transferring labels from a label magazine for in-mold labeling prior to blow molding, the label transfer apparatus comprising:

a rotary table that is rotatable about a central axis;

a first rotary motor that rotates the rotary table about the central axis;

a plurality of transfer heads each of which is rotatably mounted on the rotary table for movement thereof about an associated rotary axis that is fixed with respect to the table and spaced from the central axis such that table rotation moves the transfer head adjacent the label magazine which stores a stack of labels with an exposed end from which the labels are sequentially dispensed;

each transfer head including a pair of vacuum openings through which a vacuum is supplied; and an actuator including a second rotary motor, a rotary actuator member rotatively driven by the second rotary motor about the central axis independently of the rotary table, and a rotary connector extending between the rotary actuator and each transfer head to rotate the transfer heads relative to the table with a rolling motion to engage one of the vacuum openings thereof with the label at the exposed end of the label magazine and to initially pull an extremity of that label away from the label stack and thereby permit air to move behind the label, to subsequently pull an intermediate portion of the label away from the label stack and thereby permit more air to move behind the label, and to finally engage the other vacuum opening of each transfer head with the label to pull an opposite extremity of the label away from the label stack in a manner that permits high speed labeling.

9. A method for transferring labels from a label magazine for in-mold labeling prior to blow molding, the label transferring method comprising:

rotating a rotary table by a first rotary motor about a central axis adjacent the label magazine which stores a stack of labels with an exposed end from which the labels are sequentially dispensed;

rotatably supporting a transfer head on the rotary table about a rotary axis fixed with respect to the rotary table and spaced from the central axis;

rotating a rotary actuator member about the central axis by a second rotary motor independently of the rotary table and rotating the transfer head by a rotary connector that extends between the rotary actuator member and the transfer head;

drawing a vacuum through a pair of vacuum openings of the transfer head; and operating the first and second rotary motors to rotate the rotary table and the transfer head in opposite directions to engage one of the vacuum openings with the label at the exposed end of the label magazine and to initially pull an extremity of that label away from the label stack and thereby permit air to move behind the label, to subsequently pull an intermediate portion of the label away from the label stack and thereby permit more air to move behind the label, and to cooperate with said one vacuum opening of the first mentioned pair of vacuum openings to finally pull an opposite extremity of the label away from the label stack in a manner that permits high speed labeling.

10. The label transfer method as in claim 9 wherein a plurality of the label transfer heads are supported and rotated on the rotary table about associated fixed axes with respect to the table for movement therewith adjacent the label magazine and for rotary movement with respect to the table to provide the rolling motion that pulls each label from the label magazine.

11. The label transfer method as in claim 10 wherein the label transfer heads are rotated with respect to the rotary table by an endless belt that embodies the rotary connector and extends from the rotary actuator member to the label transfer heads.

12. The label transfer method as in claim 11 wherein the endless belt is tensioned by a tension wheel rotatably mounted on the rotary table.

13. The label transfer method as in claim 11 wherein the endless belt is tensioned by a pair of tension wheels rotatably mounted on the rotary table.

14. A method for transferring labels from a label magazine for in-mold labeling prior to blow molding, the label transferring method comprising:

rotating a rotary table by a first rotary motor about a central axis adjacent the label magazine which stores a stack of labels with an exposed end from which the labels are sequentially dispensed;

rotatably supporting a plurality of transfer heads on the rotary table about associated rotary axes that are fixed with respect to the table spaced from the central axis and from each other;

rotating a rotary actuator member about the central axis by a second rotary motor independently of the rotary table and rotating the transfer head by a rotary connector that extends between the rotary actuator member and each transfer head;

drawing a vacuum through a pair of vacuum openings of each transfer head; and operating the first and second rotary motors to rotate the rotary table and the transfer heads in opposite directions to engage one of the vacuum openings with the label at the exposed end of the label magazine and to initially pull an extremity of that label away from the label stack and thereby permit air to move behind the label, to subsequently pull an intermediate portion of the label away from the label stack and thereby permit more air to move behind the label, and to cooperate with said one vacuum opening of the first mentioned pair of vacuum openings to finally pull an opposite extremity of the label away from the label stack in a manner that permits high speed labeling.

* * * * *

UNITED STATES PATENT AND TRADEMARK OFFICE
CERTIFICATE OF CORRECTION

PATENT NO.    : 6,644,647 B2
DATED         : November 11, 2003
INVENTOR(S)   : Richard L. Dunlap, Edward L. Sanford and David M. Amirault It is certified that error appears in the above-identified patent and that said Letters Patent is hereby corrected as shown below:

Column 11,
Line 21, after "thereof" insert -- with --.

Signed and Sealed this

Twenty-ninth Day of June, 2004

JON W. DUDAS
*Acting Director of the United States Patent and Trademark Office*